March 4, 1941.  R. A. SANDBERG  2,234,010
AUTOMOBILE LOCKING STRUCTURE
Filed June 10, 1939  3 Sheets-Sheet 1
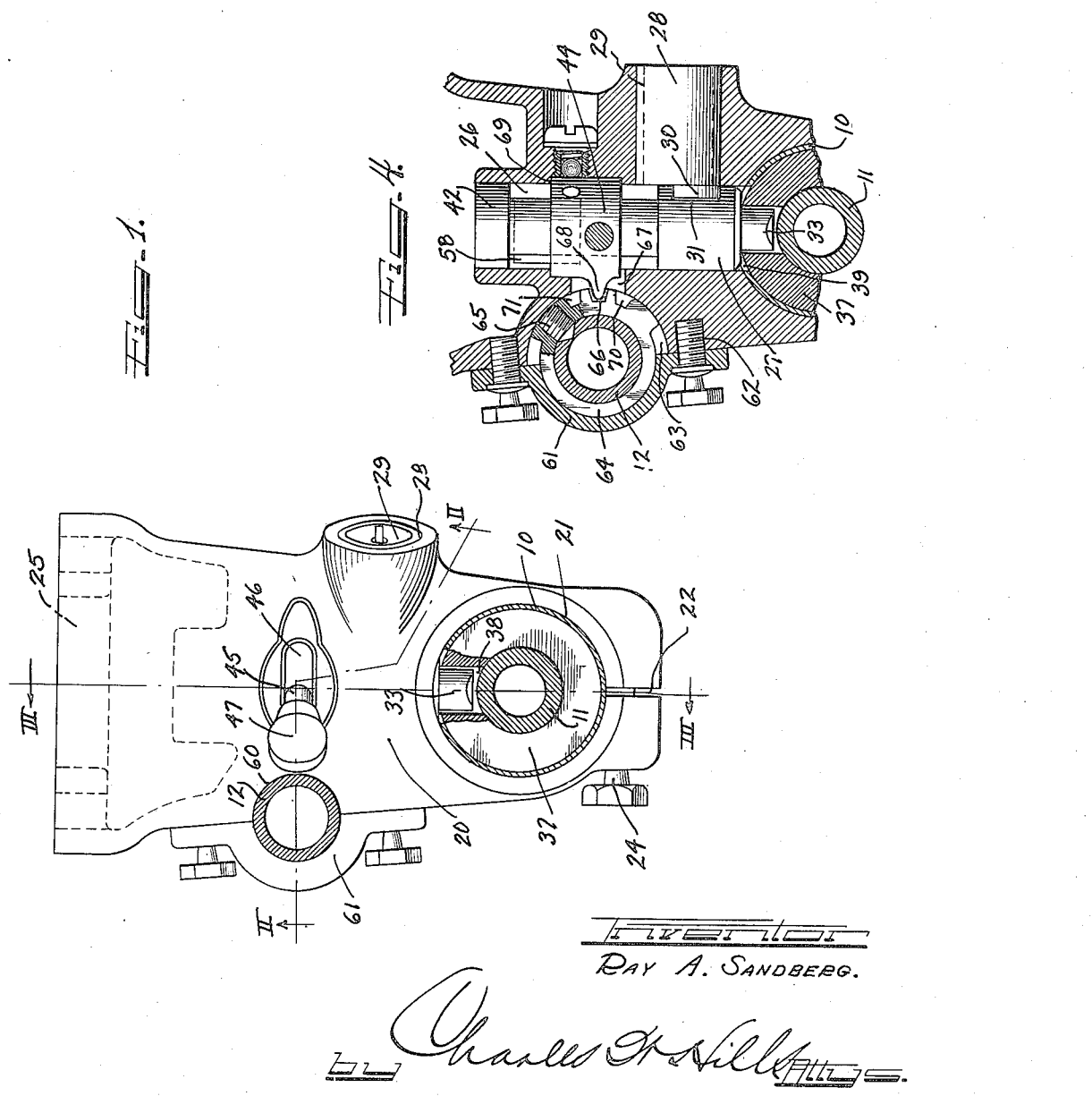
Inventor
Ray A. Sandberg.

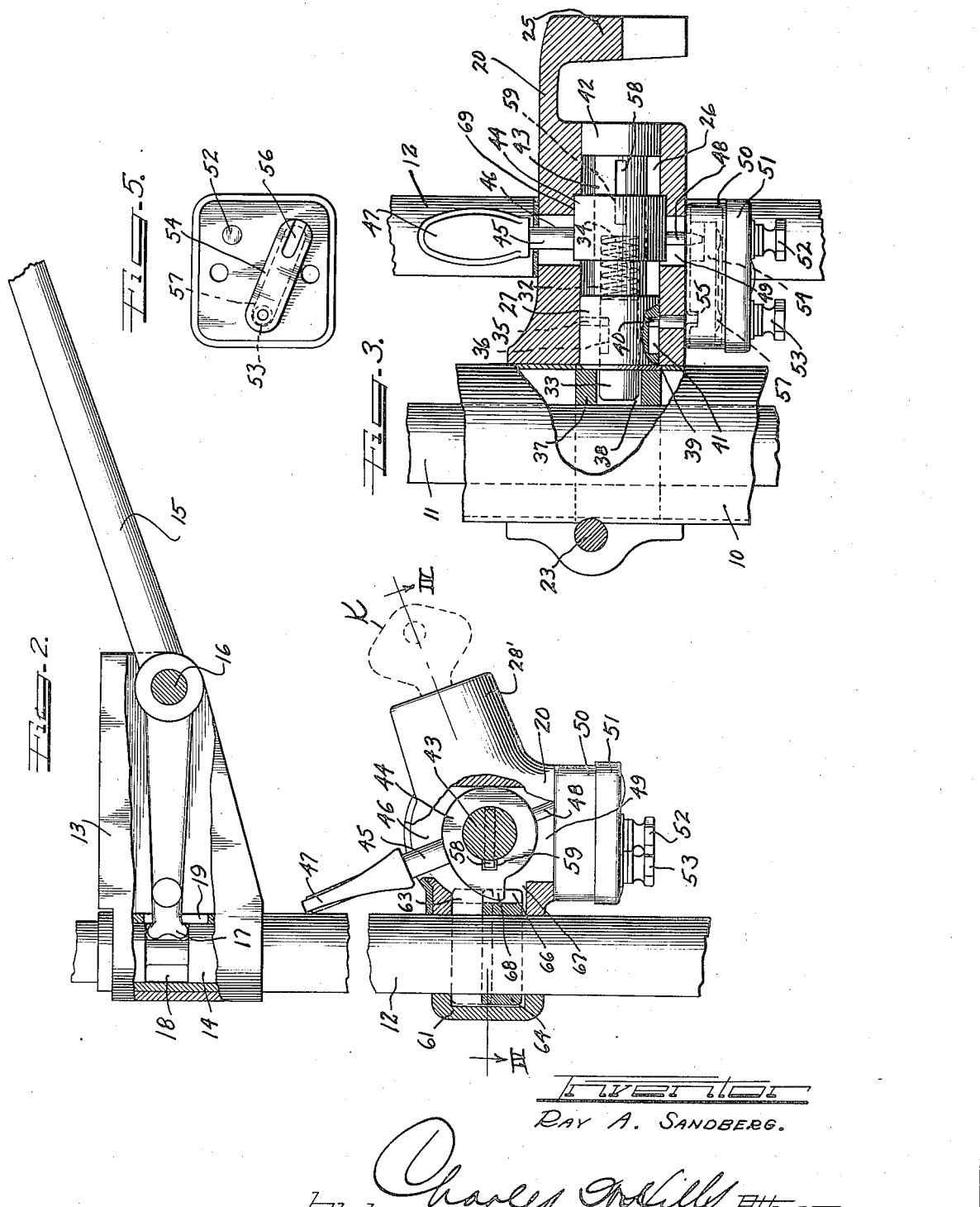

March 4, 1941. R. A. SANDBERG 2,234,010
AUTOMOBILE LOCKING STRUCTURE
Filed June 10, 1939 3 Sheets-Sheet 3
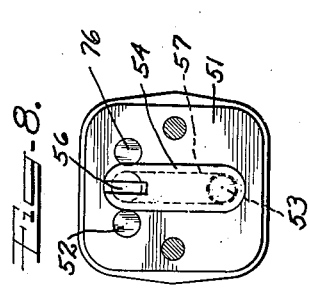
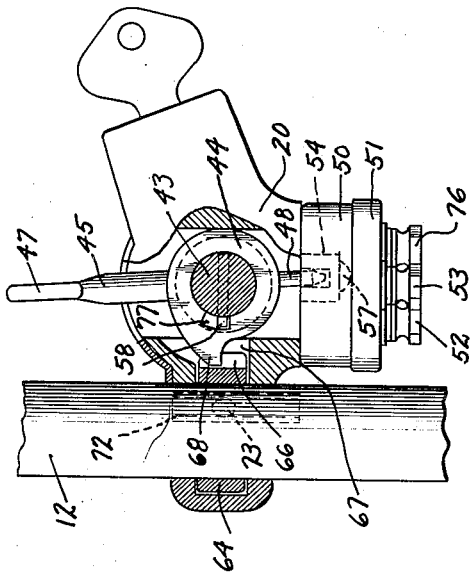
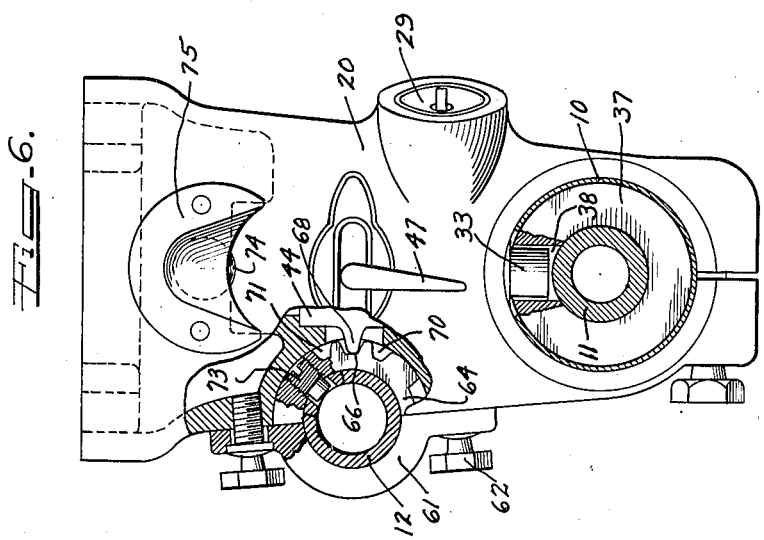
Inventor
Ray A. Sandberg.
by Charles W. Hill Atty.

Patented Mar. 4, 1941

2,234,010

UNITED STATES PATENT OFFICE 2,234,010

AUTOMOBILE LOCKING STRUCTURE

Ray A. Sandberg, Waukegan, Ill., assignor to Houdaille-Hershey Corporation, Detroit, Mich., a corporation of Michigan Application June 10, 1939, Serial No. 278,444

8 Claims. (Cl. 70—252)

This invention relates to an automobile locking structure for locking one or more controls, such as steering, ignition and transmission controls. An important object of the invention is to produce a simple single lock structure mounted on the steering column for locking the steering, the ignition, and a transmission shift controlling shaft parallel with the steering column and operable for rotation or axial shift by a hand lever arranged adjacent to the steering wheel.

The various features of my invention are incorporated in the structure shown on the drawings, in which drawings:

Figure 1 is a plan view of the locking structure mounted on the steering column.

Figure 2 is a front elevation of the locking structure partly in section, and showing the transmission control shaft and the manual lever structure;

Figure 3 is a section on the plane III-III of Figure 1;

Figure 4 is a section on the plane IV-IV of Figure 2;

Figure 5 is an inner side view of the cover for the ignition switch box;

Figure 6 is a plan view like Figure 1, showing a modified arrangement;

Figure 7 is a front view, partly in section, showing the modified arrangement; and Figure 8 is an inner side view of the switch cover and switch block.

On the drawings, 10 represents a steering column and 11 a steering shaft, to the upper end of which is secured a steering wheel (not shown). The transmission control shaft 12 is at one side of the steering column parallel therewith and is adapted for axial shift and rotational movement. The axial shifting movement of the shaft may be utilized for operating through suitable linkage the speed selection mechanism in a transmission housing, while the rotary movement of the shaft may be transmitted through other linkages with a shift lever at the transmission housing.

The structure for controlling the shifting and rotary movement of the shaft 12 is shown on Figures 1 and 2. A housing 13 extends toward the right from the upper end of the shaft 12 and is secured thereto as by welding. The upper end of the shaft receives a cylindrical extension 14 which may depend from a clamp or bracket (not shown) rigidly secured to the steering column above the housing 13. A manually operable lever 15 extends from the housing 13 and is pivoted thereto by a pin 16 at the end of the housing, the inner end 17 of the lever extending into a circumferential channel 18 formed in the stationary extension or pin 14. With this arrangement, when the lever 15 is swung laterally, the shaft 12 will be rotated, and when upward pressure is exerted on the end of the lever, the lever with the housing 13 and the shaft will be raised by virtue of the fulcrum connection of the lever end 17 on the stationary part 14, the lever end extending through an opening 19 in the upper end of the shaft.

The lock structure shown comprises a body 20 which at its forward end has a cylindrical passageway 21 therethrough for receiving the steering column, the end of the body being split as indicated at 22 whereby it may be intimately clamped to the steering column as by means of screws 23, which screws may be provided with a twist-off head 24. At its rear end, the lock body is provided with a wing or flange 25 by means of which it may be secured to the instrument or dashboard of a vehicle.

The lock body has a longitudinally extending bore 26 therethrough in which the lock bolt structure 27 is shiftable. The shifting means shown is key-operable and comprises a lock barrel 28 extending through a boss 28' of the lock body, the lock barrel housing a cylinder 29 operable by a key K for cooperation of a cam 30 on the cylinder with a slot 31 in the lock bolt structure. At its forward end, the lock bolt structure has a bore 32 for a lock bolt 33 which is urged outwardly by a spring 34 in the bore 32, the outward movement of the lock bolt being limited by a pin 35 extending into the channel 36 in the bolt.

Secured to the steering shaft 11 within the column 21 is a ring 37 having the locking recess 38 which registers with a passageway 39 in the steering column and with the bore 26 in the lock structure body, so that when the lock bolt structure is shifted outwardly by turning of the key, the lock bolt 33 will extend into the lock recess 38 to lock the steering shaft against rotation. The shifting movement of the lock bolt structure is limited by a pin 40 extending into a channel 41 in the lock bolt structure, this pin and channel engagement also preventing rotational movement of the lock bolt structure. At its outer end, a guide collar 42 is secured to the reduced outer portion 43 of the lock bolt structure.

Thus, by turning of the key, the lock bolt structure may be shifted to steering locking or steering unlocking position.

Within the bore 26 of the lock structure body is a cylindrical hub 44 from which a lever arm 45 extends upwardly through a passageway 46, the lever terminating in a finger grip 47. The hub 44 receives and is rotatable on the reduced portion 43 of the lock bolt structure and from its lower side a pin 48 extends through a passageway 49 for cooperation with switch mechanism. A switch box 50 is mounted against the lower side of the lock structure body and is closed by a cover 51 of insulating material which supports circuit terminals 52 and 53. A switch block 54 is pivoted at its inner end by means of a pivot 55 which is formed by deflecting the bottom of the switch box, the other end of the switch block having a channel 56 into which the pin 48 extends. The switch block supports a switch blade 57 whose one end is in axial alignment with the pivot 55 and always in engagement with the terminal 53 which in service may be connected with a battery. The other end of the switch blade is cooperable with the other terminal 52 from which the ignition circuit may extend. When the hub 44 is rotated by the lever 45, the switch will be opened and closed.

Provision is made to lock the hub 44 against rotation or switch-opening movement when the steering lock bolt structure is in steering locking position. The reduced bolt portion 43 on which the hub 44 is rotatable is provided with a key 58 engageable in the keyway 59 in the hub 44. When the lock bolt structure is shifted to its steering unlocking position, the key will be withdrawn from the slot so that the hub 44 may be rotated by its lever 45 for closure of the ignition switch, and when the hub is thus rotated, it will be in front of the key so that the lock bolt structure cannot be shifted back to steering locking position and the hub 44 must first be rotated back for opening of the switch to bring its slot 59 into register with the key so that the lock bolt structure may then be shifted to steering locking position, and the switch lever structure will then be locked in switch opening position.

At the side of the lock structure body, the upper and lower walls thereof have semi-circular recesses 60 for receiving the transmission controlling shaft 12, and a cap 61 is detachably secured to the lock body as by screws 62 so that the shaft 12 will be surrounded by the lock structure and guided for its rotational and axial movements. Within the space 63 provided by the lock housing and the cap 61 is a collar 64 which is secured to the shaft as by means of a set screw 65, this collar being provided with a locking notch 66 presentable at the passageway 67 between the space 63 and the bore 26 in which the switch structure hub 44 operates. The hub 44 has a locking tooth 68 which engages in the locking notch 66 when the switch lever is swung to open the switch, and this engagement of the notch and tooth will lock the shaft 12 against rotation and thereby prevent shifting of the gearing by the lever 15.

To hold the hub 44 against axial movement and for more securely locking the shaft 12, the hub may be seated in a diametrically enlarged part 69 of the bore 26. Thus, when the switch lever is in switch opening position and the lock bolt structure 27 has been locked by key operation in its steering locking position, the shaft 12 will also be locked against rotation.

The height of the space 63 is sufficient to permit enough axial upward shift of the shaft 12 with the lever 15 for transmission speed selection, but the locking collar 64 is of sufficient width so that when it is raised with the shaft to the upper position, the locking tooth on the hub 44 may still engage in the notch 66 for locking the shaft against rotation. The notch 66 may correspond with the neutral setting of the lever 15 so that the lever and shaft 12 will be locked when the transmission is in neutral. If desired, additional notches 70 and 71 may be provided so that the shaft 12 may be locked when it is in any other different speed setting, as, for example, forward or reverse speeds, or intermediate or high speeds. Then, no matter what setting position the lever 15 is in when the lock is key-operated for steering locking and ignition locking, the shaft 12 will be locked against rotation and gear shifting is prevented.

In the modified arrangement shown in Figures 6, 7 and 8, the height of the space provided by the cap 61 and the lock housing is such as to prevent axial movement of the locking collar 64 with the transmission control shaft 12, but axial shift of the shaft is permitted for transmission control setting by the lever 15. The shaft is provided with a longitudinally extending slot 72 in which extends the end of a screw 73 carried by the locking collar.

I have also shown an arrangement whereby the switch lever, besides controlling the ignition circuit, may also control another circuit, as for example, the circuit for a lamp 74 mounted on the lock body for illuminating the lock structure, particularly the keyhole and the switch lever. The lamp may be covered by a reflector cap 75 for directing the light as desired. For this additional circuit, a third contact 76 is provided on the cover 51 for the switch box and connected with one terminal of the lamp 74. When the steering lock bolt structure is shifted to its out or steering unlocking position, the locking key 58 will be clear of the switch lever hub 44 so that the lever may be swung in either direction for connecting the ignition circuit with the battery, or for connecting the battery with the terminal 76 for illumination of the lamp 74.

As shown on Figure 7, the locking key receiving notch 77 in the lever hub 44 is extended a distance circumferentially. When the switch lever is swung to open the ignition circuit and to lock the collar 64, and the steering locking bolt is shifted to steering locking position, the switch lever will be locked against manipulation to close the ignition circuit but, by virtue of the extended slot 77, the switch lever may be swung to close the lamp circuit. During such swing of the switch lever, the locking tooth 68 will move along the locking notch 66 of the locking collar 64 but will not leave the notch so that the collar remains locked to hold the control shaft 12 against rotation. However, swing of the switch lever in the opposite direction will be blocked by engagement of the switch lever hub 44 with the key 58 of the non-rotatable lock bolt structure which is in steering locking position. When the lock bolt structure is shifted to steering unlocking position then the switch lever may be swung to move the switch block in either direction from its neutral position to connect the ignition circuit or the light circuit with the battery, and before the steering can be relocked, the switch lever must be swung to bring its locking notch 77 into alignment with the locking key 58, and although the ignition circuit will be opened before steering wheel lock, the light circuit may remain connected by the switch lever. However, in the steering locking position of the lock bolt structure the switch can be manipulated only for opening of closure of the light circuit but during such manipulation the control shaft 12 will be held locked against rotational movement.

The grip end of the switch lever may be deflected forwardly as shown on Figure 6 in order that it may be more conveniently operated.

I have shown practical and efficient embodiments of the various features of my invention, but I do not desire to be limited to the exact construction, arrangement and operation shown and described, as changes and modifications may be made without departing from the scope of the invention.

I claim as my invention:

1. Automobile locking structure comprising a lock body having a clamping end, a steering column clamped by said end, a steering shaft extending through said column, a transmission control shaft adjacent to said column, an electrical switch on the lock body, a switch lever structure in the lock body for operating said switch, locking means on said switch lever engageable with the transmission control shaft to lock said shaft against control movement when said switch lever is actuated to open said switch, and key-operable means for locking said switch lever in said shaft locking position.

2. Automobile locking structure comprising a lock body having a clamping end, a steering column clamped by said end, a steering shaft extending through said column, a transmission control shaft adjacent to said column, a switch mounted on said lock body for an ignition circuit, a lever on the lock body for operating said switch, locking means on said lever cooperable with said transmission control shaft for locking said shaft against control movement when said lever is set to cause said switch to open the ignition circuit, a lock bolt in said lock body for engagement with the steering shaft to lock the steering shaft, and means controlled by the movement of said lock bolt to steering locking position for locking said switch lever in its transmission controlling shaft locking condition.

3. Automobile locking structure comprising a lock body having a clamping end, a steering column clamped by said end, a steering shaft structure extending through said column, a transmission control shaft adjacent to the steering shaft structure, an ignition switch mounted on said lock body, a switch lever for operating said switch, locking means on said switch lever cooperable with said transmission control shaft for locking said shaft against control movement when said switch lever is actuated to open said switch, a lock bolt structure shiftable in said lock body for locking cooperation with the steering shaft structure, key-operable means for shifting said lock bolt structure to steering locking or unlocking position, and cooperable locking means on said lock bolt structure and switch lever effective when said lock bolt structure is shifted to steering locking position to lock said switch lever in switch opening position and in position to maintain locking of the transmission control shaft.

4. An automobile locking structure comprising a lock body secured to the steering column of an automobile, a transmission control shaft extending through said lock body, an ignition switch mounted on the lock body, a lever for operating said switch, cooperable locking means on said transmission control shaft and said switch lever for locking said shaft against control movement when said switch lever is in position for switch opening, and key-operable locking means for locking said switch lever in its shaft locking position.

5. Automobile locking structure comprising a lock body, steering shaft and another control shaft received by said lock body, an ignition switch mounted on said lock body, a lever for operating said switch, a locking collar secured to rotate with said control shaft, means on said switch lever cooperable with said locking collar to lock said control shaft against control movement when the switch lever is moved to switch opening position, and a key-operable lock bolt for locking said switch lever in its shaft locking position or for unlocking said switch lever for movement thereof to unlock said control shaft and to close said switch.

6. Automobile locking structure comprising a lock body, a steering shaft and another control shaft received by said lock body, an ignition switch mounted on said lock body, a lever for operating said switch, a locking collar secured to rotate with said control shaft, means on said switch lever cooperable with said locking collar to lock said control shaft against control movement when the switch lever is moved to switch opening position, a key-operable lock bolt for locking said switch lever in its shaft locking position or for unlocking said switch lever for movement thereof to unlock said control shaft and to close said switch, and means whereby said lock bolt will lock said steering shaft against steering operation coincidentally with the locking of said switch lever.

7. Automobile locking structure comprising a lock body, a control shaft received thereby, an ignition switch mounted on said lock body, a switch lever for operating said switch, a collar secured to rotate with said shaft and having locking abutments, locking abutments on said switch lever cooperable with said collar abutments for locking said shaft against control movement when said switch lever is moved to switch opening position, and key-operable means for locking said switch lever in its locking position.

8. Automobile locking structure comprising a lock body and a steering shaft and a transmission control shaft received thereby, a switch on said lock structure for an ignition circuit and a second circuit, a lever for operating said switch to control said circuits, a lock bolt for the steering shaft, means for locking said lever against movement of the switch thereby to close the ignition circuit when the bolt is in steering locking position and to release said lever for movement thereby of the switch to close the ignition circuit when the lock bolt is in steering unlocking position, locking means on said lever and said transmission control shaft cooperable to lock said shaft against control movement when said bolt is in steering locking position, and means whereby said lever may be operated to control said second circuit without releasing said transmission control shaft.

RAY A. SANDBERG.